(12) United States Patent
Busby et al.

(10) Patent No.: US 6,499,839 B1
(45) Date of Patent: Dec. 31, 2002

(54) ACICULAR PARTICLE INK FORMULATION FOR AN INKJET PRINTER SYSTEM

(75) Inventors: Miles T. Busby, Charlotte, NC (US); Michael E. Bailey, Waxhaw, NC (US); James E. Fox, Warks (GB); Alan L. Hudd, Herts (GB)

(73) Assignee: Source Technologies, Inc., Charlotte, NC (US)

( * ) Notice: Subject to any disclaimer, the term of this patent is extended or adjusted under 35 U.S.C. 154(b) by 0 days.

(21) Appl. No.: 09/647,759

(22) PCT Filed: Feb. 8, 2000

(86) PCT No.: PCT/US00/03255
§ 371 (c)(1),
(2), (4) Date: Oct. 4, 2000

(87) PCT Pub. No.: WO00/47419
PCT Pub. Date: Aug. 17, 2000

Related U.S. Application Data

(60) Provisional application No. 60/119,367, filed on Feb. 9, 1999, and provisional application No. 60/119,227, filed on Feb. 9, 1999.

(51) Int. Cl.[7] .................................................. B41J 2/17
(52) U.S. Cl. ........................ 347/96; 347/100; 347/106
(58) Field of Search ......................... 347/100, 96, 101, 347/106

(56) References Cited

U.S. PATENT DOCUMENTS

| 3,509,816 A | 5/1970 | Spaulding ...................... 101/1 |
| 3,739,396 A | 6/1973 | Harada et al. ............... 346/140 |
| 3,787,879 A | 1/1974 | Ichioka et al. ............... 346/140 |
| 3,808,272 A | 4/1974 | Kerfoot et al. ......... 260/556 A |
| 3,864,691 A | 2/1975 | Schroeder .................. 346/74.1 |
| 3,864,692 A | 2/1975 | McDonnell et al. .......... 346/75 |
| 3,878,518 A | 4/1975 | Garwin ......................... 346/1 |
| 3,916,419 A | 10/1975 | Fan et al. ....................... 346/1 |
| 3,928,855 A | 12/1975 | Helinski et al. ................ 346/1 |
| 3,959,797 A | 5/1976 | Jensen ........................... 346/1 |
| 3,971,033 A | 7/1976 | Fan ............................... 346/1 |
| 3,972,053 A | 7/1976 | Skala .......................... 346/75 |
| 3,979,756 A | 9/1976 | Helinski et al. ................ 346/1 |
| 3,992,712 A | 11/1976 | Dill et al. ....................... 346/1 |
| 3,998,160 A | 12/1976 | Pearce ......................... 101/426 |
| 4,025,925 A | 5/1977 | Jensen et al. .................. 346/75 |
| 4,027,308 A | 5/1977 | Fan et al. ................. 346/140 R |
| 4,045,770 A | 8/1977 | Arnold et al. ................. 346/75 |
| 4,060,812 A | 11/1977 | Mako et al. ................... 346/75 |
| 4,063,252 A | 12/1977 | Jensen et al. .................. 346/75 |
| 4,068,240 A | 1/1978 | Fan et al. ...................... 346/75 |
| 4,070,679 A | 1/1978 | Fan et al. ...................... 346/75 |
| 4,075,636 A | 2/1978 | Galetto et al. ................. 346/75 |
| 4,078,238 A | 3/1978 | Lee .............................. 346/75 |
| 4,103,306 A | 7/1978 | Clapp ......................... 346/153 |
| 4,107,238 A | 8/1978 | Roper et al. ............. 260/880 R |
| 4,107,698 A | 8/1978 | Galetto et al. ................. 346/75 |
| 4,122,459 A | 10/1978 | Schloemann et al. ... 346/140 R |
| 4,131,899 A | 12/1978 | Christou ................. 346/140 R |

(List continued on next page.)

Primary Examiner—John Barlow
Assistant Examiner—Manish S. Shah
(74) Attorney, Agent, or Firm—Kennedy Covington Lobdell & Hickman, LLP (57) ABSTRACT

A method for inkjet printing using an ink comprised of an acicular pigment and a solvent in an inkjet printer to print on a recording medium wherein the inkjet printer has an ink reservoir and a print head. The method comprises obtaining the ink comprised of the acicular pigment and the solvent wherein the ink has a first viscosity, filling the ink reservoir of the inkjet printer with the ink, flowing the ink from the ink reservoir to the print head of the inkjet printer, and jetting the ink from the print head of the inkjet printer and onto the recording medium, wherein the ink has a second viscosity upon exiting the print head. An ink formulation(s) comprised of an acicular pigment and a solvent for use in printing images with an inkjet printer. An ink cartridge and an inkjet printing system compatible with an ink comprised of an acicular pigment.

109 Claims, 6 Drawing Sheets

U.S. PATENT DOCUMENTS

| | | |
|---|---|---|
| 4,143,381 A | 3/1979 | Downie .................. 346/1 |
| 4,158,862 A | 6/1979 | Michaud et al. ............... 360/56 |
| 4,197,563 A | 4/1980 | Michaud ...................... 360/56 |
| 4,258,371 A | 3/1981 | Sekine et al. ........... 346/140 R |
| 4,309,319 A | 1/1982 | Vaughn, Jr. ................... 260/9 |
| 4,315,267 A | 2/1982 | Sonoda et al. ............... 346/1.1 |
| 4,432,003 A | 2/1984 | Barbero et al. ......... 346/140 R |
| 4,552,469 A | 11/1985 | Tsuge et al. ................. 400/119 |
| 4,599,629 A | 7/1986 | Tsuge et al. ............ 346/140 R |
| 4,639,748 A | 1/1987 | Drake et al. ............ 346/140 R |
| 4,758,275 A | 7/1988 | Yubakami et al. ............ 106/20 |
| 4,928,125 A | 5/1990 | Iino ....................... 346/140 R |
| 5,274,567 A | 12/1993 | Kallin et al. ................ 364/478 |
| 5,291,243 A | 3/1994 | Heckman et al. ............ 355/201 |
| 5,382,963 A * | 1/1995 | Pond et al. .................. 347/102 |
| 5,463,416 A | 10/1995 | Paton et al. ................. 347/100 |
| 5,510,884 A | 4/1996 | Bov, Jr. et al. .............. 355/260 |
| 5,517,223 A | 5/1996 | Shin ............................. 347/38 |
| 5,542,487 A | 8/1996 | Schultz et al. ............ 178/4.1 A |
| 5,553,528 A | 9/1996 | Zoltner ........................ 83/443 |
| 5,736,606 A * | 4/1998 | Yanagi et al. ................ 347/100 |
| 5,808,637 A | 9/1998 | Wenzel et al. ................. 347/53 |
| 6,024,890 A * | 2/2000 | Poganiuch et al. ......... 106/403 |
| 6,048,439 A | 4/2000 | Huang et al. ............ 162/168.1 |
| 6,059,407 A | 5/2000 | Komatsu et al. ............ 347/103 |

* cited by examiner

ACICULAR PARTICLE INK FORMULATION FOR AN INKJET PRINTER SYSTEM

CROSS-REFERENCE TO RELATED APPLICATIONS

This application claims the benefit of Provisional Application No. 60/119,367, filed Feb. 9, 1999 and Provisional Application No. 60/119,227, filed Feb. 9, 1999.

FIELD OF THE INVENTION

The present invention relates to a method for inkjet printing using an ink comprised of an acicular pigment. The present invention also relates to an ink formulation(s) comprised of an acicular pigment for use in printing images with an inkjet printer, and, more specifically, to an ink cartridge and an inkjet printing system.

BACKGROUND OF THE INVENTION

Inkjet printing has gained wide acceptance in the printing industry because it is a relatively inexpensive form of printing and yet it produces high quality printed images. However, inkjet printing is complex to implement in practice. Although there are a broad range of techniques describing the non-contact printing process of propelling droplets from an inkjet printing device onto a recording medium, there are basically two classes of inkjet printing technology. They are continuous inkjet printing (CIJ) and drop on demand printing (DOD). For example, U.S. Pat. No. 5,463,416 discloses a method of operating a drop on demand inkjet printer.

In common with all drop on demand printing techniques, ink is drawn from an ink reservoir into a capillary channel in a print head. Within the channel, an energy pulse disrupts a portion of the ink into a droplet that is expelled onto a recording medium, such as paper. The energy pulse may be provided by a piezo-electric element, which vibrates to produce the pulse. Alternatively, the external stimulus may be provided by a thermal element, which heats up the ink and forms a bubble that creates a pressure wave, forcing an ink droplet out of the channel. The distribution of the ink droplets are controlled to form the desired image. Also, the droplet volume and the image resolution, in droplets per unit area, are controlled by the inkjet printer system.

There are many different types of drop on demand printing techniques and often each technique has a specific commercial implementation that affects the requirements and properties of the ink. Typically, the inks utilized by inkjet printer systems are usually limited by the viscosity specifications of the print head. For example, a print head may have a designated 8 centipoise (cPs) limit for ink viscosity. If higher viscosity inks are used, then the print head will give poor print quality as drop velocity is lowered and drop ejection becomes more erratic. If a sufficiently high viscosity ink is used, then no drops will be generated as there is insufficient energy generated in the firing process to eject droplets. Therefore, it is important to control the properties, particularly the viscosity and rheological properties of the ink during this process.

Thus, a key physical property to control in formulating inks suitable for drop on demand inkjet printing is viscosity. In general, the requirement is to formulate inks with low viscosity in order to enable the jet formation process to occur. Above a certain viscosity, it is not possible to create a jet or droplets reliably or at all. Typically, the viscosity of an ink is measured under low shear conditions relative to the high shear conditions experienced during the droplet ejection process. In generally available inks, therefore, the designated viscosity limit of the print head becomes the limit for the low shear viscosity of the ink.

Additionally, during the inkjet process, ink is subjected to shear as the droplet is formed. In general, inks that undergo shear thinning during the droplet formation process produce erratic and poor inkjet inks due to the changing viscosity properties of the inks. Thus, in creating stable and reliable droplets, it is critical that the ink fluid is in equilibrium during the changing conditions of producing the droplet. Traditionally, small sub-micron spherical particles have been dispersed within a liquid to achieve reliable performance and the volume fraction determines the viscosity of the fluid.

To form more bright and distinct images, it is often desirable to add pigment particles to the ink, thereby increasing the pigment concentration. The problem with adding pigment particles to the ink, however, is that this typically increases the viscosity of the ink. With the increased viscosity of the ink, the ink's resistance to flow is increased, requiring a greater amount of energy to expel the droplet. The increased viscosity of a preferred ink, therefore, may exceed the capacity of the print head. When the ink viscosity exceeds specifications of the print head, there is not enough energy generated within the print head to reliably expel the droplet. Thus, poor print quality and printing failure are the result. Thus, viscosity is a key restriction for ink formulators and significantly limits the solids loading of colorant or other material that can be incorporated into an ink formulation. As a result, this limits the number of applications in which inkjet can be used commercially.

As mentioned above, increased pigment concentration is generally desirable in all types of inkjet printing. One specific type of inkjet printing that would benefit from increased pigment concentration is MICR printing. One way to automatically read printed characters is to form the characters with inks that can be magnetized and read by magnetic ink character. recognition (MICR) devices. For example, magnetic ink characters passing through a MICR reader are first energized with a magnetic field and then the magnetic signal from each character is sensed to determine the character. The ability of a MICR reader to recognize a magnetic ink character is a function of the quality of the form of the character and the ability of the magnetic ink to sustain a magnetic field once it has been magnetized, as measured by the ink's magnetic properties, remnance and coercivity. Maximizing the amount of magnetic particles added to the ink enhances the magnetic ink's magnetic field strength, and thus, increases the readability of the character.

Current methods of MICR printing produce characters that can be reliably read, however, these methods are relatively sophisticated and expensive. Typically, MICR printing is currently performed using offset presses, laser printers, and impact printers. The offset press process generally involves large, expensive, complicated machinery and magnetic inks/pastes that may be difficult to handle. This type of machinery is used mainly by businesses whose main concern is printing large volumes of materials, as opposed to businesses where MICR printing is a secondary or internal concern. Similarly, MICR printing with laser printers is relatively expensive as the laser printer itself is very costly. Additionally, using magnetic toners is expensive as printing with laser toner cartridges is already one of the more costly methods of printing, while the specialized magnetic toners add even more cost. Impact printers with magnetic printer ribbons are also costly and are not as efficient and reliable as other methods because they rely on mechanical parts to perform the printing. Thus, a low cost, unsophisticated, yet practical and reliable way to perform MICR printing is desired.

Inkjet technology, in general, is attractive because it is relatively inexpensive compared with offset printing and laser printing. Inkjet technology, however, has never been commercially successful for MICR printing as far as can be determined. One of the basic problems is that in order to form a character that can hold the required magnetic field, a large mass of magnetic particles is required in the ink solution. Additionally, the increased mass of magnetic particles produces a higher viscosity solution. The larger mass of particles and resulting higher viscosity solution make it difficult for inkjet printers to form and expel droplets.

Further, once an appropriate combination of magnetic particles, ink viscosity, and inkjet printer head are found, then it is difficult to keep the magnetic particles from falling out of suspension. And when the magnetic particles do happen to fall out of suspension, it is difficult to redisperse the particles because they tend to aggregate or flocculate (clump together). Thus, printing MICR characters with inkjet technology printers has not yet proven to be commercially feasible.

Another problem with magnetic ink printing, especially for inkjet printers, is that it is difficult to maintain a homogeneous mixture of the liquid magnetic ink suspension, as the heavy magnetic particles tend to settle. A similar problem with ink having large and heavy pigment particles has led to the development of devices to agitate the ink wells storing the ink to be printed. These separate agitators, however, require additional parts that increase the expense, and reduce the reliability, of the device.

Further, a thicker or more viscous magnetic ink solution may be utilized to reduce the amount of settling. This produces printing problems, however, especially with inkjet printers. Typically, traditional drop on demand inks have a viscosity in the range of 1.5 to 12 centipoise (cPs) for optimum operation. A centipoise is 0.01 poise, where poise is a unit of dynamic viscosity of a fluid in which there is a tangential force of 1 dyne per square centimeter resisting the flow of two parallel fluid layers past each other when their differential velocity is 1 centimeter per second per centimeter of separation. This limited range is often a factor that restricts the concentration of pigment particles that can be used in developing inks with useful properties.

Thus, there is a need to produce an ink that can be reliably utilized in an economical inkjet printer for printing images.

SUMMARY OF THE INVENTION

It is an object of the present invention to provide a method of using an ink comprised of an acicular pigment and a solvent in an inkjet printer to print on a recording medium.

One embodiment of the present invention is a method of using an ink comprised of an acicular pigment and a solvent in an inkjet printer to print on a recording medium. The method involves obtaining an ink which is comprised of an acicular pigment and a solvent and which has a first viscosity, filling the ink reservoir of the inkjet printer with the ink, flowing the ink from the ink reservoir to the print head of the inkjet printer, and jetting the ink from the print head and onto the recording medium. Upon exiting the print head, the ink has a second viscosity. In another embodiment of the present invention, the acicular pigment may be a surface modified acicular pigment. In another embodiment of the present invention, the ink further comprises a dispersant, and in yet another embodiment the ink may further comprise a polymer.

It is another object of the present invention to produce an ink formulation(s) that can be reliably utilized in an economical inkjet printer for printing images. It is yet another object of the present invention to disperse particles with solids loading much greater than is typically used and yet maintain reliable dispersion properties and inkjet performance by using acicular particles with a given aspect ratio. Therefore, in accordance with the present invention, inks have been formulated with very high solids loading using acicular particles as opposed to spherical particles. The viscosity of the inks of the present invention, measured under very low rates of shear are much higher than traditional inkjet inks and would typically be considered to one skilled in the art as too high for reliable inkjet printing.

In one embodiment of the present invention, an ink formulation comprises an alcohol, an acicular pigment, and a transition metal complex. In yet another embodiment of the present invention, an ink formulation comprises diacetone alcohol, iron oxide, and di(dioctyl)pyrophosphate oxoethylene titanate.

It is another object of the present invention to provide an ink cartridge for use in an inkjet printing system.

In another embodiment of the present invention, an inkjet cartridge comprises a) an ink comprised of an acicular pigment and a solvent, and b) an ink reservoir. In another embodiment of the present invention, the acicular pigment is surface modified. In another embodiment of the present invention, the ink further comprises a dispersant. In yet another embodiment of the present invention, the ink further comprises a polymer.

It is a further object of the present invention to provide an inkjet printing system.

In one embodiment of the present invention, the inkjet printing system is comprised of a) an inkjet print head, b) an ink reservoir, and c) an ink comprised of an acicular pigment and a solvent. In another embodiment of the present invention, the acicular pigment is surface modified. In another embodiment of the present invention, the ink further comprises a dispersant. In yet another embodiment of the present invention, the ink further comprises a polymer.

DETAILED DESCRIPTION OF THE INVENTION

An acicular pigment is comprised of pigment particles. The term "acicular" as used in the context of the present invention refers; to pigment particles that are shaped like flakes, flat plates, or needles. Thus, in the case of an acicular pigment, its particles are, for example, needle-shaped as opposed to spherical.

Acicular pigment particles have what is referred to as an average aspect ratio. An average aspect ratio is the ratio of the average particle length to the average particle diameter (L/D). In the present invention, the average aspect ratio is preferably in the range of about 1.5:1 to about 10:1. The average aspect ratio is more preferably about 3:1 to about 8:1, and is most preferably about 6:1. Correspondingly, the acicular particles preferably have an average length in the range of about 0.1 microns to about 0.5 microns, and more preferably about 0.3 microns. The acicular particles preferably have an average diameter in the range of about 0.03 microns to about 0.07 microns, preferably about 0.05 microns. The average aspect ratio is typically measured by, for example, an electron microscope or by a particle size analyzer.

In another embodiment of the present invention, the acicular pigments can be surface modified. For example, an acicular pigment particle can be surface modified by having a coating applied to the surface of a particle or, for example, the acicular pigment particle can be chemically treated to modify the chemical functionality of the particle surface.

The selection of a pigment in accordance with the present invention depends upon the requirements of a given application. For example, for a magnetic ink, a pigment with the desired magnetic properties is chosen, or, for a colored ink, a pigment with the correct shade of color is chosen. Pigments that may be used in accordance with the present invention include, but are not limited to, iron oxides (red, black, magnetite), barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes and carbon black. A preferred pigment of the present invention is iron oxide.

The present invention is also directed to a method of using an ink comprised of an acicular pigment and a solvent in an inkjet printer to print on a recording medium, such as paper. Solvents are chosen that have properties useful for inkjet printing, such as surface tension, volatility, viscosity, health and safety and other miscellaneous concerns. The surface tension of the solvent must be greater than about 30 dynes/cm in order to insure reliable inkjet printing. Surface tension can be measured, for example, using a "Surface and Interfacial Tension Torsion Balance—Model OS" supplied by White Electrical. This instrument measures the force required to move a platinum ring (of known dimensions) from the surface of a fluid. For example, the solvent must not be too volatile, because if the ink dries too fast it clogs the nozzle of the printer. Generally, the solvent should not be carcinogenic, corrosive, flammable, etc. A suitable solvent in accordance with the present invention includes, but is not limited to, lactates (such as ethyl lactate and butyl lactate), acetates (such as butyl acetate, methoxypropyl acetate), ketones (such as methyl ethyl ketone and methyl isobutyl ketone), esters, aldehydes, alcohols (such as ethanol and diacetone alcohol), water, aromatic hydrocarbons (such as xylene and napthalene), aliphatic hydrocarbons (such as decane), halogenated hydrocarbons (such as trichloroethane), ethers, glycols (such as methoxypropanol and diethylene glycol) and pyrrolidones. A preferred solvent of the present invention is an alcohol. Most preferred is diacetone alcohol.

The ink used in accordance with the present invention may further comprise a dispersant. A dispersant is optional when a surface modified acicular pigment is used. A dispersant is typically made up of a "head" section and a "tail" section; the "head" binds to or associates with the surface of a pigment and the "tail" is soluble in the solvent used. To achieve a good dispersion, the two sections included in the dispersant should be of different functionalities or chemistries and more preferably be incompatible. This means that ideally, all of one type of functionality binds to or adheres to the surface of the pigment and all of the other type of functionality is solvated by the solvent and extends from the pigment surface into solution. This mechanism prevents the particles from coming into contact with one another and agglomerating or flocculating. Suitable dispersants in accordance with the present invention include, but are not limited to, modified alkynes, silanes, silicones, polysiloxanes, polyphosphates, transition metal complexes, titanates, zirconates, polyacrylate copolymers, urethanes, phosphonates, polyamides, dendrimers, polyvinylpyrrolidone copolymers, lecithins, isocyanates, alkyds, and melamines. Preferred dispersants of the present invention are transition metal complexes. More preferred are titanates or zirconates. Most preferred is di(dioctyl)pyrophosphate oxoethylene titanate. Furthermore, the dispersant may be anionic, cationic or non-ionic as required by a given application.

The ink may further comprise a polymer to modify the rheological properties and improve the jetting performance and inkjet reliability. Many dispersants are polymeric materials, however, their purpose is to disperse the pigment (as described above), whereas a second polymeric material may be added to modify the rheology and jetting characteristics of the ink. Polymers that may be used in accordance with the present invention, include but are not limited to, acrylics, styrene acrylics, polyvinylpyrrolidones, polyvinylacetates, polyvinylbutyrals, polyvinylalcohols, polyvinylchlorides, vinyl chloride-vinyl acetate-maleic acid terpolymer ("VMCA"), phenolics, novolacs, polyurethanes, polyketones, polyacrylonitrile, styrene-butadiene, ethylenevinylacetate, polyamides, and polyesters. A preferred polymer of the present invention is an acrylic polymer. Particularly preferred is a styrene acrylic polymer.

Figure 1:
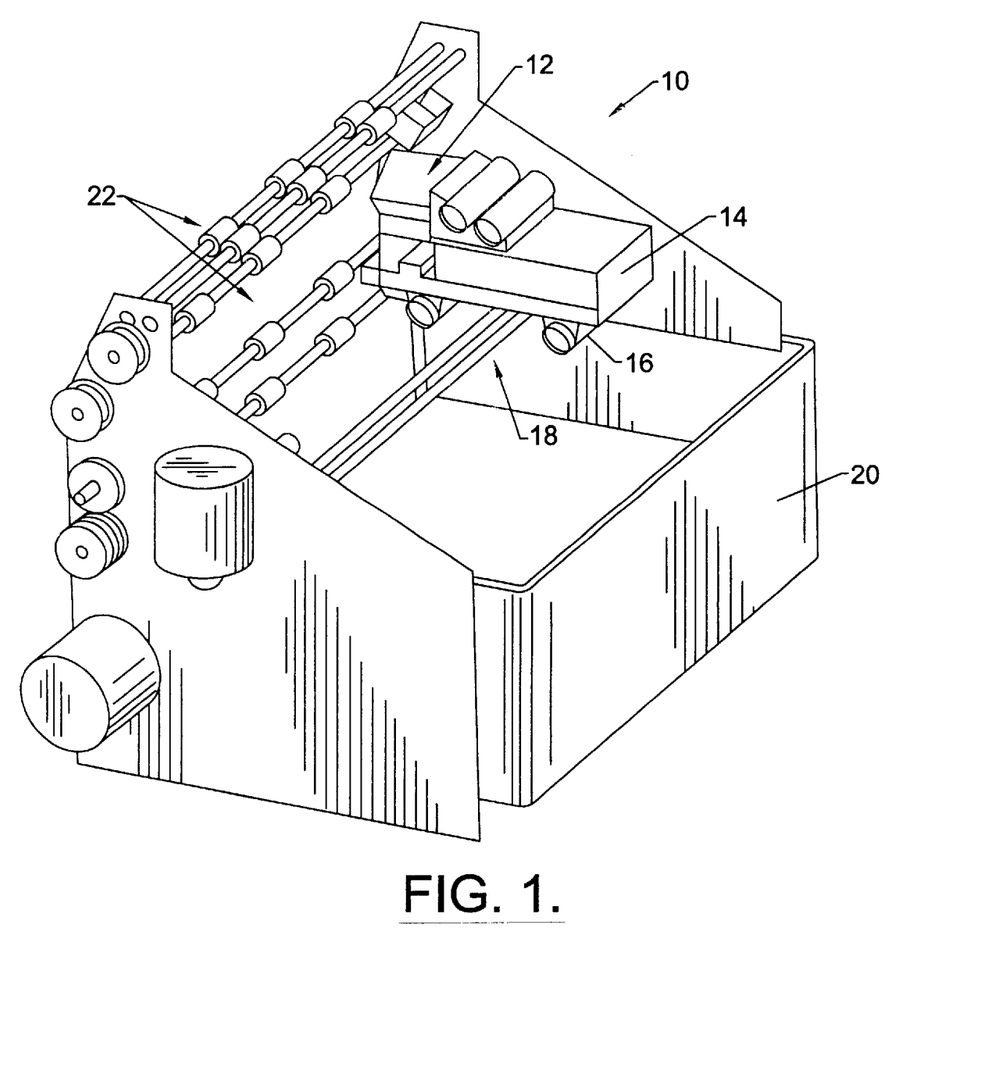
FIG. 1 is a perspective view of an inkjet printer system according to the present invention.
Figure 2:
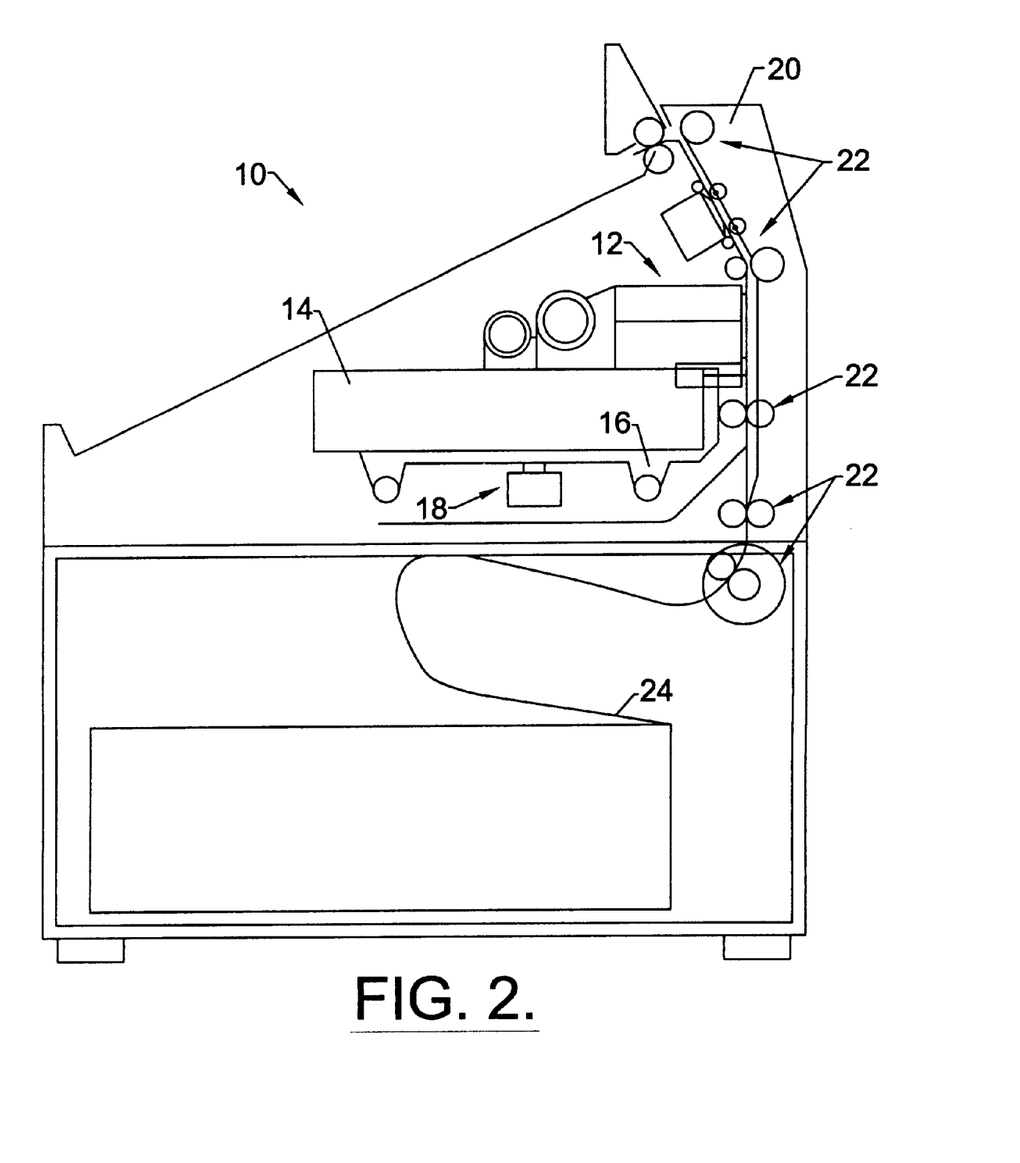
FIG. 2 is a side view, with the side of the housing removed to expose the internal components, of the inkjet printer system of FIG. 1.

Referring to FIGS. 1 and 2, an inkjet printer system 10 typically comprises an inkjet print head 12 and ink supply reservoir 14 removably mounted to a carriage 16. Carriage 16 translates on guide rails 18 from one end of housing 20 to the other. Carriage 16 is adjacent and moves parallel to rotatable wheels 22 that feed recording medium 24, such as paper, into printer system 10. During the printing operation, droplets of ink are jetted from the translating inkjet print head 12 onto recording medium 24. Wheels 22 rotate to move recording medium 24 to enable print head 12 to jet ink onto the recording medium.

Figure 3:
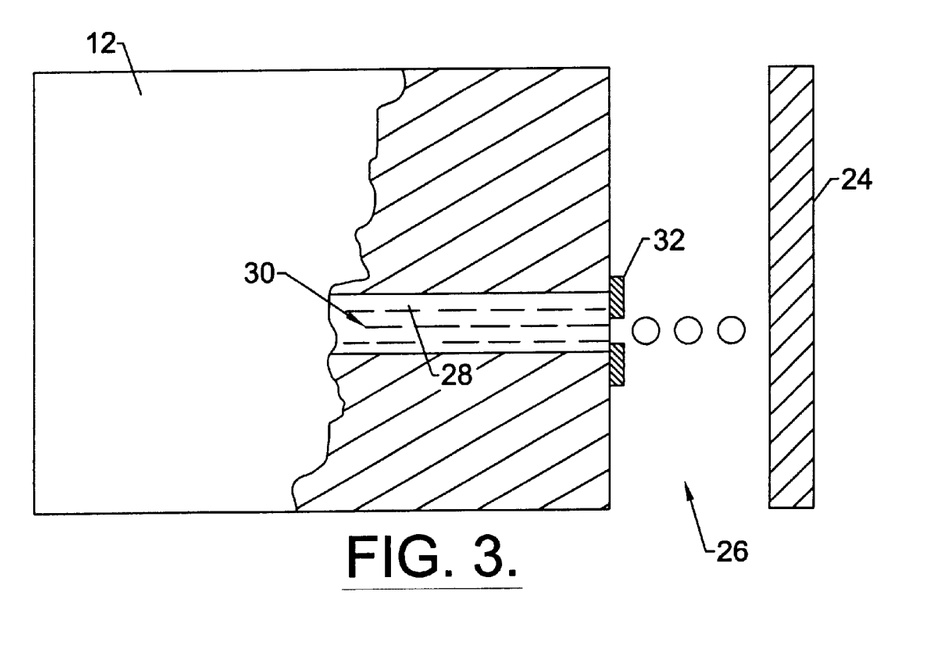
FIG. 3 is a schematic representation of the print head and associated components of the present invention.

Referring to FIG. 3, print head 12 jets ink droplets 26 from channel 28 onto recording medium 24. Channel 28 is filled with ink 30 from ink reservoir 14. Ink 30 is expelled from nozzle 32 by an energy pulse within channel 28. Preferably, the energy pulse may be provided by the movement of a piezo-electric element. Alternatively, the energy pulse may be provided by a thermal element that heats ink 30 within channel 28, forming a bubble that ejects ink droplets 26.

In the method of the present invention, an ink comprised of an acicular pigment and a solvent is obtained. The ink has a first viscosity when the ink is at rest or under low shear (resting viscosity). The ink reservoir of the printer is then filled with the ink, and the ink flows from the ink reservoir to the print head of the inkjet printer and is jetted from the print head onto a recording medium. The ink has a second viscosity upon exiting the print head or under high shear (jetting viscosity). The second viscosity of the ink is less than the first viscosity. In other words, the jetting viscosity is less than the resting viscosity. Therefore, the ink of the present invention advantageously has a high pigment concentration (i.e. high viscosity) at low shear. Meanwhile, the ink of the present invention advantageously has a low viscosity at high shear which enables the ink to be utilized in generally available inkjet printers with low viscosity capacity print heads.

Figure 4:
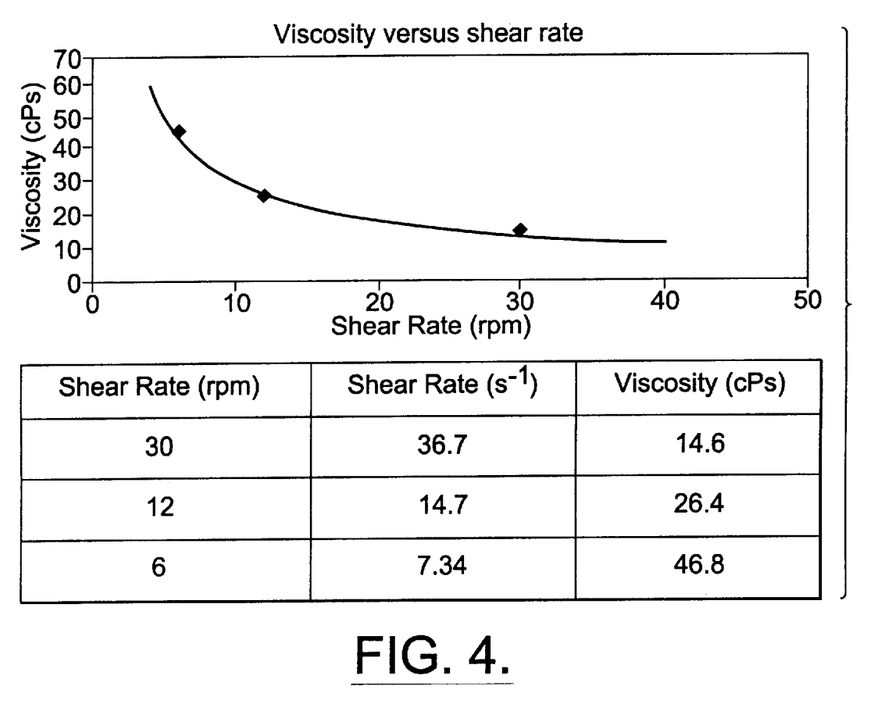
FIG. 4 is a graph of viscosity versus shear rate and a table with corresponding data points.
Figure 6:
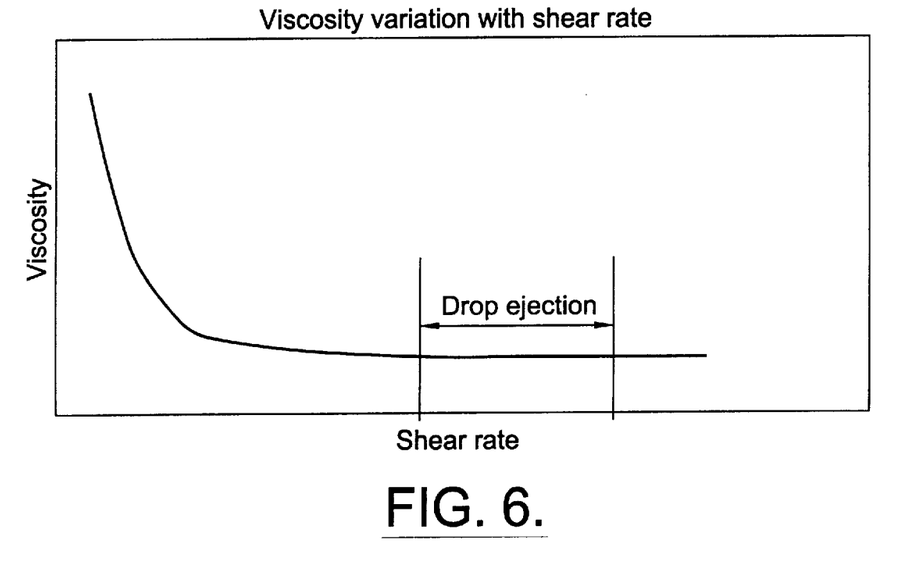
FIG. 6 is a graph of viscosity versus shear rate for an ink formulation for an inkjet printer in accordance with the present invention.

Referring to FIGS. 4 and 6, the ink comprised of acicular pigment particles begins to exhibit significant shear thinning behavior at relatively low shear rates, as demonstrated with a Brookfield DV-II+ viscometer with a UL adapter. The adapter is specifically designed for low viscosity fluids (such as inkjet inks) and rotates a spindle (cylindrical bob) inside a tube filled with fluid. The gap between the spindle and the tube is known and the torque required to rotate the spindle at the rotation rate selected is, measured and used to calculate the viscosity. At the first viscosity, the shear rate is about 0.01 $s^{-1}$ to about $10^3$ $s^{-1}$, preferably 1 $s^{-1}$. The droplet ejection process in an inkjet print head is a high shear process, and at the second viscosity the shear rate is about $10^3$ $s^{-1}$ to about $10^7$ $s^{-1}$, preferably $10^5 s^{-1}$. To achieve reliable droplet ejection, the ink viscosity needs to be stable (i.e. not changing significantly, relatively flat) throughout the range of shear rates experienced during the ejection process. Hence, shear thinning is typically an undesirable property for an inkjet ink and leads to poor jetting reliability.

Figure 5:
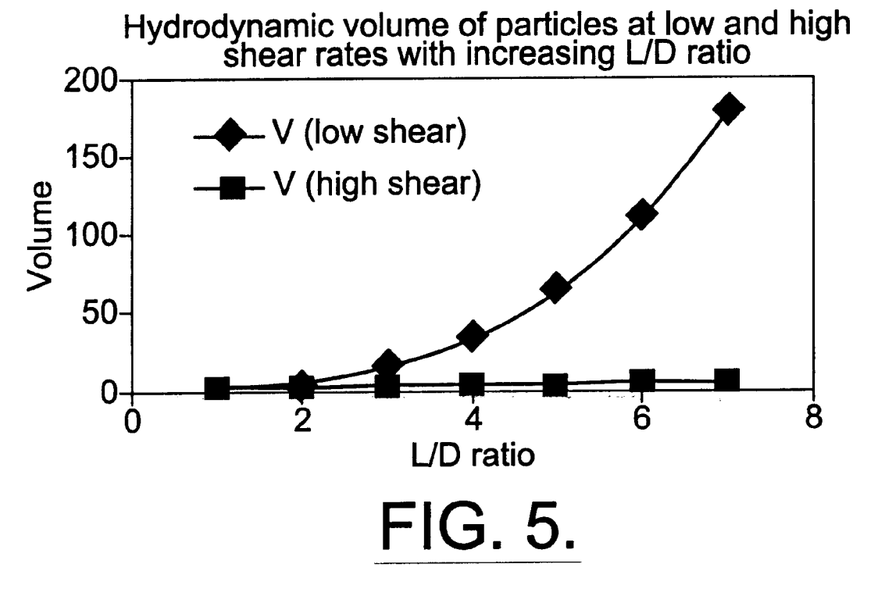
FIG. 5 is a graph of hydrodynamic. volume of particles at low and high shear rates with increasing length to diameter (L/D) ratio.

The mechanism by which the shear thinning is thought to occur in the method of the present invention is due in part to the acicular nature of the pigment particles. It is postulated that in the method of the present invention, wherein an ink comprised of an acicular pigment is employed, the particles align in the direction of flow/shear when a shear force is applied. Under no or low shear, the particles are randomly aligned and are free to rotate, having no preferred orientation. This means that their hydrodynamic volume (their effective volume in the fluid) is the volume of the sphere that is swept out by rotation of the particle around any axis. As the shear rate is increased, the force applied pauses the particles to align and means that the particles now have a preferred orientation and so their hydrodynamic volume tends to their physical volume. These two volumes are always the same for spherical particles and so spherical particles are not expected to exhibit the same shear thinning behavior. Viscosity can be linked to particle concentration by the Stokes-Einstein equation, which states that the viscosity of the ink is related to the volume fraction of particles in suspension. It is postulated that at low shear the hydrodynamic volume of the pigment particles tends to their rotational volume, whereas at higher shear rates the hydrodynamic volume tends to their true, physical volume. This means that at higher shear rates the volume fraction of the pigment particles is apparently lower and so the viscosity is correspondingly lower. Referring to FIG. 5, the difference between these two volumes increases significantly as the L/D (length to diameter) ratio of the particles is increased. Hence, enhancing the L/D ratio may be expected to increase the shear thinning effects observed.

The proposed mechanisms attempt to explain the surprising and unexpected result of reliable printing with an ink that displays shear thinning characteristics and also that at low shear rates has a viscosity in excess of that which can typically be jetted by an ink jet print head.

The present invention is also directed to an ink formulation(s) comprised of an acicular pigment for an inkjet printer. A preferred embodiment of the present invention is an ink formulation comprising an alcohol, an acicular pigment, and a transition metal complex. The acicular pigment has an average aspect ratio in the preferred ranges stated previously as well as a particle length and diameter as in the preferred ranges stated previously. In the ink formulation, the alcohol is preferably about 74% to about 97% by weight of the formulation, the acicular pigment is preferably about 2% to about 25% by weight of the formulation, and the transition metal complex is preferably about 0.05% to about 2% by weight of the formulation. In the ink formulation, the alcohol is more preferably about 89% to about 93% by weight of the formulation, the acicular pigment is more preferably about 5% to about 15% by weight of the formulation, and the transition metal complex is more preferably about 0.06% to about 0.2% by weight of the formulation. In the ink formulation, the ink may further comprise a polymer and the polymer is preferably about 0.1 to about 4% by weight of the formulation, more preferably about 0.25% to about 2% by weight of the formulation.

In another ink formulation in accordance with the present invention, the ink formulation comprises diacetone alcohol, iron oxide, and di(dioctyl)pyrophosphate oxoethylene titanate. The iron oxide has an average aspect ratio in the preferred ranges stated previously as well as a particle length and diameter as in the preferred ranges stated previously. In the ink formulation, the diacetone alcohol is preferably about, 74% to about 97% by weight of the formulation, the iron oxide is preferably about 2% to about 25% by weight of the formulation, and the di(dioctyl)pyrophosphate oxoethylene titanate is preferably about 0.05% to about 2% by weight of the formulation. In the ink formulation, the diacetone alcohol is more preferably about 89% to about 93% by weight of the formulation, the iron oxide is more preferably about 5% to about 15% by weight of the formulation, and the di(dioctyl)pyrophosphate oxoethylene titanate is more preferably about 0.06% to about 0.2% by weight of the formulation. In the ink formulation, the ink may further comprise a polymer and the polymer is preferably about 0.1% to about 4% by weight of the formulation, more preferably about 0.25% to about 2% by weight of the formulation.

In the preferred ink formulation of the present invention comprising an alcohol, an acicular pigment, and a transition metal complex, by way of example, this embodiment may be produced by creating an acicular particle dispersion comprising in the range of about 15% to about 35%, preferably about 25% pigment; in the range of about 0.2% to about 5%, preferably about 0.4% dispersant; and in the range, of about 65% to about 85%, preferably about 75% solvent. The dispersion is milled for about 1.5 to about 5 hours in an Eiger manufacturing mill. However, the milling time depends upon the efficiency of the mill and the initial form of the pigment (i.e. if the particles are initially clumped together or in a fine particle form). The dispersion is then adjusted to the desired viscosity by further addition of the solvent ("let down") to achieve the above ink formulation.

For producing a magnetic ink, for example, a pigment that has magnetic properties was chosen. Suitable pigments include iron oxides and metallic particles. Also, pigments are chosen such that their particle size does not block the inkjet print head nozzle. Typically, such a pigment size is about 1 micron. Suitable pigment particles include iron oxide, such as Magnox HDM-X-7040 commercially available from Magnox-Pulaski. A dispersant having a head section that bonds well with the chosen pigment is desired. If the pigment is inorganic like iron oxide, for example, than an ionic dispersant is commonly chosen. For iron oxide, a transition metal chelate is preferred. Suitable dispersants include a titanate dispersant, such as Kenrich KR138S commercially available from Kenrich Petrochemicals. Furthermore, for iron oxide with a titanate dispersant, a solvent such as an alcohol or an ester may be utilized. A suitable solvent includes an alcohol solvent, such as diacetone alcohol.

In the preferred ink formulation of the present invention comprising diacetone alcohol, iron oxide, and a titanate dispersant, by way of example, this embodiment may be produced by creating an iron oxide dispersion, comprising about 25% iron oxide, about 0.4% titanate dispersant, and about 75% alcohol solvent. The dispersion is milled for about 1.5 to 5 hours in an Eiger manufacturing mill. The iron oxide dispersion is then let down with further solvent to get the above ink solution formulation. This formulation results in a magnetic ink for ink jet printing that can be reliably jetted and that is stable, reducing the flocculation of the pigment particles. Additionally, this ink formulation allows the concentration of magnetic pigment particles to be maximized, thereby increasing the magnetic properties of the ink. Thus, the above ink formulation results in an ink that may be reliably utilized in standard ink jet printers.

The present invention also relates to an ink cartridge for use in an inkjet printer. The ink cartridge comprises a) an ink comprised of an acicular pigment and a solvent, and b) an ink reservoir. The acicular pigment may be surface modified, and the ink may further comprise a dispersant and/or a polymer. Any of the ink formulations disclosed herein are preferred for the ink cartridge.

The present invention also relates to an inkjet printing system. The inkjet printing system comprises an inkjet print head, an ink reservoir, and an ink comprised of an acicular pigment and a solvent. The acicular pigment may be surface modified, and the ink may further comprise a dispersant and/or a polymer. Any of the ink formulations disclosed herein are preferred for the inkjet printing system.

Examples of ink formulations in accordance with the present invention are as follows:

TABLE 1

|  | % by weight |
|---|---|
| Diacetone alcohol (Solvent) | 90.54% |
| Kenrich KR138S (Dispersant) | 0.13% |
| Iron Oxide HDM-X-7040 (Acicular Pigment) | 9.33% |
| Viscosity at 25° C. | 15.1 cPs |
| Shear Rate | 30 rpm |

TABLE 2

|  | % by weight |
|---|---|
| Diacetone alcohol (Solvent) | 90.54% |
| Kenrich KR138S (Dispersant) | 0.13% |
| Iron Oxide HDM-S-7041 (surface modified) | 9.33% |
| Viscosity at 25° C. | 15.4 cPs |
| Shear Rate | 30 rpm |

TABLE 3

|  | % by weight |
|---|---|
| Tripropyleneglycol monomethyl ether (TPM) (Solvent) | 96.0 |
| Joncryl 682 (Dispersant/Polymer) | 1.1 |
| Magnetic pigment HHO-394D | 2.9 |
| Viscosity at 25° C. | 10.2 cPs |
| Shear Rate | 30 rpm |

TABLE 4

|  | % by weight |
|---|---|
| n-Butanol (Solvent) | 90.75 |
| Laropal A81 (Dispersant/Polymer) | 2.50 |
| DisperBYK 163 (Dispersant) | 0.50 |
| Magnetic pigment HHO-394D | 6.25 |
| Viscosity at 25° C. | 16.1 cPs |
| Shear Rate | 30 rpm |

TABLE 5

|  | % by weight |
|---|---|
| Octanol (Solvent) | 88.5 |
| Polyvinyl pyrrolidone (PVP) K15 (Dispersant/Polymer) | 3.8 |
| Oleic acid (Dispersant) | 1.3 |
| Magnetic pigment HHO-394D | 6.4 |
| Viscosity at 25° C. | 16.2 cPs |
| Shear Rate | 30 rpm |

TABLE 6

|  | % by weight |
|---|---|
| Methoxypropylacetate (MPA) (Solvent) | 84.35 |
| Laropal A81 (Dispersant/Polymer) | 4.35 |
| EFKA 48 (Dispersant) | 0.43 |
| Magnetic pigment HDM-X-7040 | 10.87 |
| Viscosity at 25° C. | 14.4 cPs |
| Shear Rate | 30 rpm |

TABLE 7

|  | % by weight |
|---|---|
| Methoxypropanol (Solvent) | 90.42 |
| Kenrich KR138S (Dispersant) | 0.13 |
| Magnetic pigment HDM-X-7040 | 9.45 |
| Viscosity at 25° C. | 10.0 cPs |
| Shear Rate | 30 rpm |

Note:
Joncryl 682 is commercially available from S. C. Johnson.
DisperBYK 163 is commercially available from BYK Chemie.
PVP K15 is commercially available from ISP (International Specialty Products).
Laropal A81 is commercially available from BASF.
EFKA 48 is commercially available from Lubrizol.
Iron Oxide Pigments HHO-394D, HDM-S-7041, HDM-X-7040 are commercially available from Magnox-Pulaski.
Kenrich KR138S is commercially available from Kenrich Petrochemicals.
Note: The initial dispersion may be created in a manner similar to that described above.

Although the invention has been described with reference to these preferred embodiments, other embodiments can achieve the same results. Variations and modifications of the present invention will be apparent to one skilled in the art, and the following claims are intended to cover all such modifications and equivalents.

We claim:

1. A method of using an ink comprised of an acicular pigment, a solvent, and a dispersant in an inkjet printer to print on a recording medium wherein the inkjet printer has an ink reservoir and a print head, the method comprising:
   a) obtaining the ink comprised of the acicular pigment, the solvent, and the dispersant wherein the ink has a first viscosity,
   b) filling the ink reservoir of the inkjet printer with the ink,
   c) flowing the ink from the ink reservoir to the print head of the inkjet printer, and
   d) jetting the ink from the print head of the ink jet printer and onto the recording medium wherein the ink has a second viscosity upon exiting the print head,
wherein the ink is subjected to a shear rate of about $0.01\ s^{-1}$ to about $10^3\ s^{-1}$ at the first viscosity.

2. The method according to claim 1, wherein the ink is subjected to a shear rate of about $10^3\ s^{-1}$ to about $10^7\ s^{-1}$ at the second viscosity.

3. The method according to claim 1, wherein the acicular pigment is selected from the group consisting of iron oxide, barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes, carbon black and a combination thereof.

4. The method according to claim 3, wherein the acicular pigment is iron oxide.

5. The method according to claim 1, wherein the solvent is selected from the group consisting of lactates, acetates, ketones, esters, aldehydes, alcohols, water, aromatic hydrocarbons, aliphatic hydrocarbons, halogenated hydrocarbons, ethers, glycols, pyrrolidones and a combination thereof.

6. The method according to claim 5, wherein the solvent is an alcohol.

7. The method according to claim 1, wherein the dispersant is selected from the group consisting of modified alkynes, silanes, silicones, polysiloxanes, polyphosphates, transition metal complexes, polyacrylate copolymers, urethanes, phosphonates, polyamides, dendrimers, polyvinylpyrrolidone copolymers, lecithins, isocyanates, alkyds, melamines, and a combination thereof.

8. The method according to claim 7, wherein the dispersant is a transition metal complex.

9. The method according to claim 1, wherein the ink further comprises a polymer.

10. The method according to claim 9, wherein the polymer is selected from the group consisting of acrylics, styrene acrylics, polyvinylpyrrolidones, polyvinylacetates, polyvinylbutyrals, polyvinyl alcohols, polyvinylchlorides, VMCA, phenolics, novolacs, polyurethanes, polyketones, polyacrylonitrile, styrene-butadiene, ethylenevinylacetate, polyamides, and polyesters.

11. The method according to claim 1, wherein the acicular pigment is comprised of particles and the particles have an average aspect ratio of particle length to particle diameter of about 1.5:1 to about 10:1.

12. The method according to claim 11, wherein the average aspect ratio of particle length to particle diameter is about 3:1 to about 8:1.

13. The method according to claim 12, wherein the average aspect ratio of particle length to particle diameter is about 6:1.

14. The method according to claim 1, wherein the second viscosity is less than the first viscosity.

15. A method of using an ink comprised of an acicular pigment and a solvent in an inkjet printer to print on a recording medium wherein the inkjet printer has an ink reservoir and a print head, the method comprising:
   a) obtaining the ink comprised of the acicular pigment and the solvent wherein the ink has a first viscosity,
   b) filling the ink reservoir of the inkjet printer with the ink,
   c) flowing the ink from the ink reservoir to the print head of the inkjet printer, and
   d) jetting the ink from the print head of the inkjet printer and onto the recording medium wherein the ink has a second viscosity upon exiting the print head,
wherein the ink is subjected to a shear rate of about $0.01\ s^{-1}$ to about $10^3\ s^{-1}$ at the first viscosity.

16. The method according to claim 15, wherein the ink is subjected to a shear rate of about $10^3\ s^{-1}$ to about $10^7\ s^{-1}$ at the second viscosity.

17. The method according to claim 15, wherein the acicular pigment is selected from the group consisting of iron oxide, barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes, carbon black and a combination thereof.

18. The method according to claim 17, wherein the acicular pigment is iron oxide.

19. The method according to claim 15, wherein the solvent is selected from the group consisting of lactates, acetates, ketones, esters, aldehydes, alcohols, water, aromatic hydrocarbons, aliphatic hydrocarbons, halogenated hydrocarbons, ethers, glycols, pyrrolidones and a combination thereof.

20. The method according to claim 15, wherein the solvent is an alcohol.

21. The method according to claim 15, wherein the ink further comprises a dispersant.

22. The method according to claim 21, wherein the dispersant is selected from the group consisting of modified alkynes, silanes, silicones, polysiloxanes, polyphosphates, transition metal complexes, polyacrylate copolymers, urethanes, phosphonates, polyamides, dendrimers, polyvinylpyrrolidone copolymers, lecithins, isocyanates, alkyds, and melamines, and a combination thereof.

23. The method according to claim 22, wherein the dispersant is a transition metal complex.

24. The method according to claim 15, wherein the ink further comprises a polymer.

25. The method according to claim 24, wherein the polymer is selected from the group consisting of acrylics, styrene acrylics, polyvinylpyrrolidones, polyvinylacetates, polyvinylbutyrals, polyvinylalcohols, polyvinylchlorides, VMCA, phenolics, novolacs, polyurethanes, polyketones, polyacrylonitrile, styrene-butadiene, ethylenevinylacetate, polyamides, and polyesters.

26. The method according to claim 15, wherein the acicular pigment is comprised of particles and the particles have an average aspect ratio of particle length to particle diameter of about 1.5:1 to about 10:1.

27. The method according to claim 26, wherein the average aspect ratio of particle length to particle diameter is about 3:1 to about 8:1.

28. The method according to claim 27, wherein the average aspect ratio of particle length to particle diameter is about 6:1.

29. The method according to claim 15, wherein the second viscosity is less than the first viscosity.

30. An ink formulation comprising:
   a) about 74% by weight to about 97% by weight of an alcohol,
   b) about 2% by weight to about 25% by weight of an acicular pigment, and
   c) about 0.05% by weight to about 2% by weight of a transition metal complex, wherein the percentages by weight are based upon the weight of the ink formulation.

31. The ink formulation according to claim 30, wherein the alcohol is diacetone alcohol.

32. The ink formulation according to claim 30, wherein the acicular pigment is selected from the group consisting of iron oxide, barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes, carbon black and a combination thereof.

33. The ink formulation according to claim 30, wherein the transition metal complex is a titanate or a zirconate.

34. The ink formulation according to claim 30, wherein the acicular pigment is comprised of particles and wherein the particles have an average aspect ratio of particle length to particle diameter of about 1.5:1 to about 10:1.

35. The ink formulation according to claim 34, wherein the average aspect ratio of particle length to particle diameter is about 3:1 to about 8:1.

36. The ink formulation according to claim 35, wherein the average aspect ratio of particle length to particle diameter is about 6:1.

37. The ink formulation according to claim 30, wherein the acicular pigment is comprised of particles and wherein the particles have an average particle length of about 0.1 microns to about 0.5 microns.

38. The ink formulation according to claim 37, wherein the average particle length is about 0.3 microns.

39. The ink formulation according to claim 30, wherein the acicular pigment is comprised of particles and wherein the acicular pigment particles have an average particle diameter of about 0.03 microns to about 0.07 microns.

40. The ink formulation according to claim 39, wherein the average particle diameter is about 0.05 microns.

41. The ink formulation according to claim 31, further comprising a polymer.

42. The ink formulation according to claim 41, wherein the polymer is selected from the group consisting of acrylics, styrene acrylics, polyvinylpyrrolidones, polyvinylacetates, polyvinylbutyrals, polyvinylalcohols, polyvinylchlorides, VMCA, phenolics, novolacs, polyurethanes, polyketones, polyacrylonitrile, styrene-butadiene, ethylenevinylacetate, polyamides, and polyesters.

43. The ink formulation according to claim 42, wherein the polymer is a styrene acrylic.

44. The ink formulation according to claim 30, wherein the alcohol is about 89% to about 93% by weight of the formulation, the acicular pigment is about 5% to about 15% by weight of the formulation, and the transition metal complex is about 0.06% to about 0.2% by weight of the formulation.

45. The ink formulation according to claim 44, wherein the polymer is about 0.1% to about 4% by weight of the formulation.

46. An ink formulation comprising:
   a) diacetone alcohol,
   b) iron oxide, and
   c) di(dioctyl)pyrophosphate oxoethylene titanate.

47. The ink formulation according to claim 46, wherein the diacetone alcohol is about 74% to about 97% by weight of the formulation, the iron oxide is about 2% to about 25% by weight of the formulation, and the di(dioctyl) pyrophosphate oxoethylene titanate is about 0.05% to about 2% by weight of the formulation.

48. The ink formulation according to claim 47, wherein the diacetone alcohol is about 89% to about 93% by weight of the formulation, the iron oxide is about 5% to about 15% by weight of the formulation, and the di(dioctyl) pyrophosphate oxoethylene titanate is about 0.06% to about 0.2% by weight of the formulation.

49. The ink formulation according to claim 46, wherein the iron oxide is comprised of particles and wherein the particles have an average aspect ratio of particle length to particle diameter of about 1.5:1 to about 10:1.

50. The ink formulation according to claim 49, wherein the average aspect ratio of particle length to particle diameter is about 3:1 to about 8:1.

51. The ink formulation according to claim 50, wherein the average aspect ratio of particle length to particle diameter is about 6:1.

52. The ink formulation according to claim 46, wherein the acicular pigment is comprised of particles and the particles have an average particle length of about 0.1 microns to about 0.5 microns.

53. The ink formulation according to claim 52, wherein the average particle length is about 0.3 microns.

54. The ink formulation according to claim 46, wherein the acicular pigment is comprised of particles and the particles have an average particle diameter of about 0.03 microns to about 0.07 microns.

55. The ink formulation according to claim 54, wherein the average particle diameter is about 0.05 microns.

56. The ink formulation according to claim 46, further comprising a polymer.

57. The ink formulation according to claim 56, wherein the polymer is selected from the group consisting of acrylics, styrene acrylics, polyvinylpyrrolidones, polyvinylacetates, polyvinylbutyrals, polyvinylalcohols, polyvinylchlorides, VMCA, phenolics, novolacs, polyurethanes, polyketones, polyacrylonitrile, styrene-butadiene, ethylenevinylacetate, polyamides, and polyesters.

58. The ink formulation according to claim 57, wherein the polymer is a styrene acrylic.

59. The ink formulation according to claim 47, wherein the polymer is about 0.1% to about 4% by weight of the formulation.

60. An ink cartridge for use in an inkjet printing system comprising:
   a) an ink comprised of an acicular pigment, a solvent, and di(dioctyl)pyrophosphate oxoethylene titanate, and
   b) an ink reservoir.

61. The cartridge according to claim 60, wherein the acicular pigment is selected from the group consisting of iron oxide, barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes, carbon black and a combination thereof.

62. The cartridge according to claim 61, wherein the acicular pigment is iron oxide.

63. The cartridge according to claim 60, wherein the solvent is selected from the group consisting of lactates, acetates, ketones, esters, aldehydes, alcohols, water, aromatic hydrocarbons, aliphatic hydrocarbons, halogenated hydrocarbons, ethers, glycols, pyrrolidones and a combination thereof.

64. The cartridge according to claim 63, wherein the solvent is an alcohol.

65. The cartridge according to claim 64, wherein the alcohol is diacetone alcohol.

66. The cartridge according to claim 60, wherein the ink further comprises a polymer.

67. The cartridge according to claim 66, wherein the polymer is selected from the group consisting of acrylics, styrene acrylics, polyvinylpyrrolidones, polyvinylacetates, polyvinylbutyrals, polyvinylalcohols, polyvinylchlorides, VMCA, phenolics, novolacs, polyurethanes, polyketones, polyacrylonitrile, styrene-butadiene, ethylenevinylacetate, polyamides, and polyesters.

68. The cartridge according to claim 60, wherein the acicular pigment is comprised of particles and the particles have an average aspect ratio of particle length to particle diameter of 1.5:1 to about 10:1.

69. The cartridge according to claim 68, wherein the average aspect ratio of particle length to particle diameter is about 3:1 to about 8:1.

70. An ink cartridge for use in an inkjet printing system comprising:
a) an ink comprised of about 0.05% by weight to about 2% by weight of a transition metal complex, about 2% by weight to about 25% by weight of an acicular pigment and about 74% by weight to about 97% by weight of a solvent, wherein the percentages by weight are based upon the weight of the ink formulation, and
b) an ink reservoir.

71. The cartridge according to claim 70, wherein the acicular pigment is selected from the group consisting of iron oxide, barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes, carbon black and a combination thereof.

72. The cartridge according to claim 70, wherein the acicular pigment is iron oxide.

73. The cartridge according to claim 70, wherein the solvent is selected from the group consisting of lactates, acetates, ketones, esters, aldehydes, alcohols, water, aromatic hydrocarbons, aliphatic hydrocarbons, halogenated hydrocarbons, ethers, glycols, pyrrolidones and a combination thereof.

74. The cartridge according to claim 73, wherein the solvent is an alcohol.

75. The cartridge according to claim 74, wherein the alcohol is diacetone alcohol.

76. The cartridge according to claim 70, wherein the transition metal complex is di(dioctyl)pyrophosphate oxoethylene titanate.

77. The cartridge according to claim 70, wherein the ink further comprises a polymer.

78. The cartridge according to claim 77, wherein the polymer is selected from the group consisting of acrylics, styrene acrylics, polyvinylpyrrolidones, polyvinylacetates, polyvinylbutyrals, polyvinylalcohols, polyvinylchlorides, VMCA, phenolics, novolacs, polyurethanes, polyketones, polyacrylonitrile, styrene-butadiene, ethylenevinylacetate, polyamides, and polyesters.

79. The cartridge according to claim 76, wherein the acicular pigment is comprised of particles and the particles have an average aspect ratio of particle length to particle diameter of about 1.5:1 to about 10:1.

80. The cartridge according to claim 88, wherein the average aspect ratio of particle length to particle diameter is about 3:1 to about 8:1.

81. An inkjet printing system comprising:
a) an inkjet print head,
b) an ink reservoir, and
c) an ink comprised of an acicular pigment, a solvent, and di(dioctyl)pyrophosphate oxoethylene titanate.

82. The system according to claim 81, wherein the acicular pigment is selected from the group consisting of iron oxide, barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes, carbon black and a combination thereof.

83. The system according to claim 82, wherein the acicular pigment is iron oxide.

84. The system according to claim 81, wherein the solvent is selected from the group consisting of lactates, acetates, ketones, esters, aldehydes, alcohols, water, aromatic hydrocarbons, aliphatic hydrocarbons, halogenated hydrocarbons, ethers, glycols, pyrrolidones and a combination thereof.

85. The system according to claim 84, wherein the solvent is an alcohol.

86. The system according to claim 85, wherein the alcohol is diacetone alcohol.

87. The system according to claim 81, wherein the ink further comprises a polymer.

88. The system according to claim 87, wherein the polymer is selected from the group consisting of acrylics, styrene acrylics, polyvinylpyrrolidones, polyvinylacetates, polyvinylbutyrals, polyvinylalcohols, polyvinylchlorides, VMCA, phenolics, novolacs, polyurethanes, polyketones, polyacrylonitrile, styrene-butadiene, ethylenevinylacetate, polyamides, and polyesters.

89. The system according to claim 81, wherein the acicular pigment is comprised of particles and the particles have an average aspect ratio of particle length to particle diameter of about 1.5:1 to about 10:1.

90. The system according to claim 89, wherein the average aspect ratio of particle length to particle diameter is about 3:1 to about 8:1.

91. An inkjet printing system comprising:
a) an inkjet print head,
b) an ink reservoir, and
c) an ink comprised of about 0.05% by weight to about 2% by weight of a transition metal complex, about 2% by weight to about 25% by weight of an acicular pigment and about 74% by weight to about 97% by weight of a solvent, wherein the percentages by weight are based upon the weight of the ink formulation.

92. The system according to claim 91, wherein the acicular pigment is selected from the group consisting of iron oxide, barium ferrite, strontium ferrite, titanium dioxide, calcium carbonate, zinc oxide, copper phthalocyanine, lanthanide and actinide complexes used in fluorescent pigments, metallic flakes, aryl amides, anthraquinones, quinacridones, perylenes, carbon black and a combination thereof.

93. The system according to claim 92, wherein the acicular pigment is iron oxide.

94. The system according to claim 91, wherein the solvent is selected from the group consisting of lactates, acetates, ketones, esters, aldehydes, alcohols, water, aromatic hydrocarbons, aliphatic hydrocarbons, halogenated hydrocarbons, ethers, glycols, pyrrolidones and a combination thereof.

95. The system according to claim 94, wherein the solvent is an alcohol.

96. The system according to claim 95, wherein the alcohol is diacetone alcohol.

97. The system according to claim 91, wherein the transition metal complex is di(dioctyl)pyrophosphate oxoethylene titanate.

98. The system according to claim 91, wherein the ink further comprises a polymer.

99. The system according to claim 98, wherein the polymer is selected from the group consisting of acrylics, styrene acrylics, polyvinylpyrrolidones, polyvinylacetates, polyvinylbutyrals, polyvinylalcohols, polyvinylchlorides, VMCA, phenolics, novolacs, polyurethanes, polyketones, polyacrylonitrile, styrene-butadiene, ethylenevinylacetate polyamides, and polyesters.

100. The system according to claim 91, wherein the acicular pigment is comprised of particles and the particles have an average aspect ratio of particle length to particle diameter of 1.5:1 to about 10:1.

101. The system according to claim 100, wherein the average aspect ratio of particle length to particle diameter is about 3:1 to about 8:1.

102. The method according to claim 1, wherein the acicular pigment is surface modified.

103. The method according to claim 15, wherein the acicular pigment is surface modified.

104. The ink formulation according to claim 30, wherein the acicular pigment is surface modified.

105. The ink formulation according to claim 46, wherein the iron oxide is surface modified.

106. The cartridge according to claim 60, wherein the acicular pigment is surface modified.

107. The cartridge according to claim 70, wherein the acicular pigment is surface modified.

108. The system according to claim 81, wherein the acicular pigment is surface modified.

109. The system according to claim 91, wherein the acicular pigment is surface modified.

\* \* \* \* \*